United States Patent
Kim

(10) Patent No.: US 6,206,459 B1
(45) Date of Patent: Mar. 27, 2001

(54) REINFORCEMENT STRUCTURE FOR REAR WHEEL HOUSING OF VEHICLE

(75) Inventor: Ki-Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/471,778

(22) Filed: Dec. 23, 1999

(30) Foreign Application Priority Data

Jun. 21, 1999 (KR) .................................. 99-23269

(51) Int. Cl.[7] ........................................... B60J 7/00
(52) U.S. Cl. ...................... 296/198; 296/195; 296/203.04
(58) Field of Search ................................ 296/198, 195, 296/203.04, 31

(56) References Cited

U.S. PATENT DOCUMENTS

| | | | |
|---|---|---|---|
| 4,408,794 | * 10/1983 | Harasaki | 296/198 |
| 4,723,811 | * 2/1988 | Harasaki | 296/198 |
| 4,919,474 | * 4/1990 | Adachi et al. | 296/198 |
| 4,950,025 | * 8/1990 | Yoshi | 296/195 |
| 5,018,780 | * 5/1991 | Yoshi et al. | 296/195 |
| 5,127,666 | * 7/1992 | Fujinaka et al. | 296/198 |
| 5,180,206 | * 1/1993 | Toyoda | 296/195 |
| 5,350,214 | * 9/1994 | Yamauchi et al. | 296/198 |
| 5,580,121 | * 12/1996 | Dange et al. | 296/198 |
| 5,743,590 | * 4/1998 | Baumann | 296/198 |
| 5,778,322 | * 8/1998 | Wolf et al. | 296/203.04 |

* cited by examiner

Primary Examiner—Joseph D. Pape
Assistant Examiner—Kiran Patel
(74) Attorney, Agent, or Firm—Christie, Parker & Hale, LLP

(57) ABSTRACT

A reinforcement structure for rear wheel housing of vehicle wherein a wheel housing inner panel and wheel housing cover of rear wheel housing are respectively coupled by a plurality of reinforcement members to further reduce vibration levels at intermediate and high speed booming domains, such that noise generated by resonance with exciting frequency input from road surface while a vehicle is running can be greatly decreased, the rear wheel housing including a wheel housing cover and a wheel housing inner panel protruded upwards to install a shock absorber of rear suspension system and wheels at left/right tip end parts of rear floor panel, the structure comprising: first and second reinforcement members for being respectively coupled up and down at front corner part formed by front and side surfaces of the wheel housing inner panel and extended to define closed sections upto a rear floor panel; a third reinforcement member extended fieldwise and coupled to a bottom surface of the wheel housing cover between first and second mounting parts formed toward external side of the vehicle body; and a fourth reinforcement member crosswise extended and coupled to a central portion of the first and second mounting parts.

3 Claims, 7 Drawing Sheets

REINFORCEMENT STRUCTURE FOR REAR WHEEL HOUSING OF VEHICLE

BACKGROUND OF THE INVENTION

1. Field of the Invention

The present invention relates to a reinforcement structure for a rear wheel of a vehicle, and more particularly to a reinforcement structure for a rear wheel of a vehicle adapted to reinforce a strength to a rear wheel housing unit of a vehicle body to thereby reduce generation of noise caused by changes of a sound field inside a vehicle.

2. Description of the Prior Art

Generally, a vehicle body receives a load input from a road surface via a suspension system while a vehicle is running, to cause a frame of the vehicle body to be deformed. The deformation of the frame serves to change air flow, resulting in changes in a sound field inside the vehicle. The change of the sound field in turn results in noise, so called, road noise.

In order to reduce the road noise, an increase of strength to a chassis mounting unit such as a suspension, sub-frame, rear cross member and the like is much required.

Meanwhile, a rear body of a conventional vehicle is formed with a rear wheel housing 12 protruded to an upper side of an inner area of the vehicle for installing a shock absorber of a rear suspension system, wheels and the like toward left/right sides of rear floor panel 10 (see FIG. 1).

The rear wheel housing 12 includes a wheel housing cover 14 for securing an upper end of a shock absorber to an upper end thereof, a wheel housing inner panel 16 semi-spherically extended downward from the wheel housing cover 14, a flange coupling unit 18 extended to an external side of the wheel housing inner panel 16, a cover reinforcing material 20 encompassing a marginal part of the wheel housing cover 14 and a quarter inner panel 30 coupled to the flange coupling unit 18 (see FIG. 2).

However, as a result of normal mode analysis through Computer Aided Engineering CAE against the wheel housing cover 14 and wheel housing inner panel 16 of a conventional rear wheel housing 12, it was found out that the vibration level of the wheel housing inner panel 16 is increased at an intermediate speed of booming domain which is between 200 Hz and 400 Hz ("A" domain in FIG. 2). Furthermore, it was also found out that vibration level of the wheel housing cover 14 is increased at a high speed booming domain of 400 Hz~600 Hz.

When the wheel housing cover 14 and the wheel housing inner panel 16 at the rear wheel housing 12 are increased in vibration levels thereof at respectively intermediate and high speed booming domains, there occurs a problem of noise generation due to resonance with frequency resulted from the load input from the external side.

Under the presumption that reinforced strength to the mounting part of the wheel housing cover 14 at the rear wheel housing 12 decreases the vibration level generated when the load of external force input from the road surface to thereby reduce the level of noise generation, an analysis was made through a frequency response function curve in FIG. 3 which classifies vibration level versus strength level against three mounting parts formed at the wheel housing cover 14 at the rear wheel housing 12 for respective domains of low, intermediate and high frequencies.

As a result, in comparison with a third mounting part 14c formed at an inner side of the wheel housing cover 14 of the rear wheel cover 12, it was found out that sensitive inertance exists at intermediate and high booming domains of first and second mounting parts 14a and 14b formed forward and backward directions of vehicle body at external side of the wheel housing cover 14.

At this point, the vibration level is based on vertical direction (Z axis) of the vehicle body while change of accelerated speed (m/s$^2$) per external unit power is defined in log scale. Furthermore the strength level represents stiffness level (Kgf) required for moving a unit field (mm) while frequency domain defines engine revolutions from 0 Hz to 800 Hz.

The frequency domain whose peak of vibration level abruptly rises can be interpreted that resonance in alignment with the load input from external side is high according to the frequency response function curve illustrated in FIG. 3. The fear of high resonance may be justly inferred to be a generation cause of road noise according to sound field change inside the vehicle.

According to the analysis, a requirement is that a structure strength reinforcement to the first and second mounting parts 14a and 14b at the wheel housing cover 14 and to the wheel housing inner panel 16 at the rear wheel housing 12 should do something in relieving sensitive inertance caused by a sudden rise of frequency due to resonance with the load input from the road surface while a vehicle is running.

The present invention is disclosed to solve the aforementioned problems and it is an object of the present invention to provide a reinforcement structure for a rear wheel housing of a vehicle constructed to reinforce a structural stiffness against a wheel housing inner panel and a wheel housing cover at the rear wheel housing to reduce inertance against the rear wheel housing part at intermediate and high booming domains, thereby reducing road noise inside the vehicle caused by sound field change according to the resonance.

In accordance with the object of the present invention, there is provided a reinforcement structure for a rear wheel housing of a vehicle, the rear wheel housing including a wheel housing cover and a wheel housing inner panel protruded upwards to install a shock absorber of a rear suspension system and wheels to left/right tip end parts of a rear floor panel, the structure comprising:

first and second reinforcement members for being respectively coupled up and down at a front corner part formed by front and side surfaces of the wheel housing inner panel and extended to define closed sections upto a rear floor panel;

a third reinforcement member extended fieldwise and coupled to a bottom surface of the wheel housing cover between first and second mounting parts formed toward an external side of the vehicle body; and a fourth reinforcement member crosswise extended and coupled to a central portion of the first and second mounting parts.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

Figure 4:
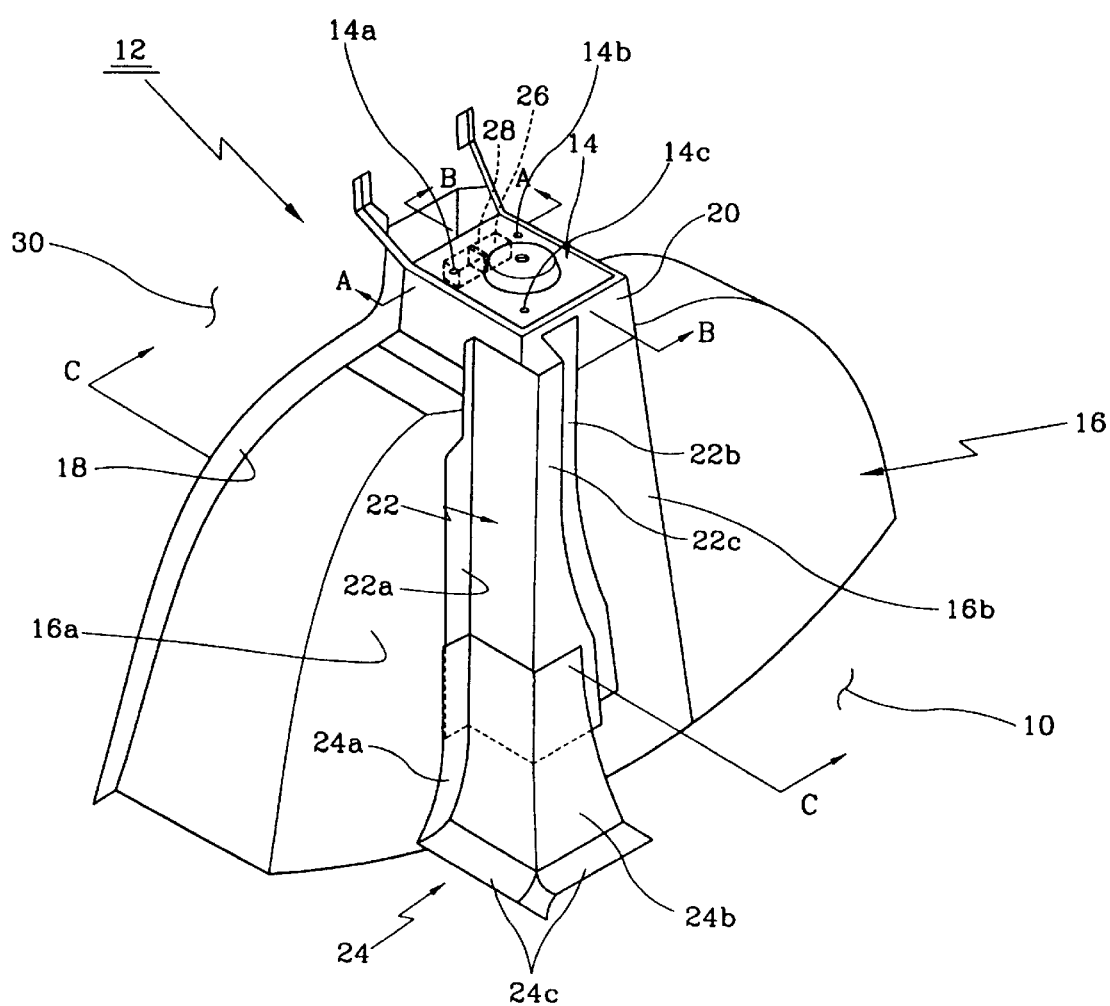
FIG. 4 is a schematic perspective view for illustrating a rear wheel housing portion of a vehicle body according to the present invention.
Figure 5:
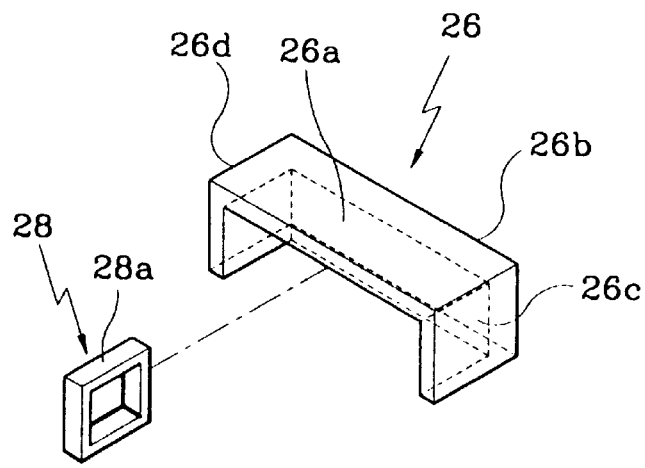
FIG. 5 is perspective view of a reinforcement member illustrated in FIG. 4.
Figure 6:
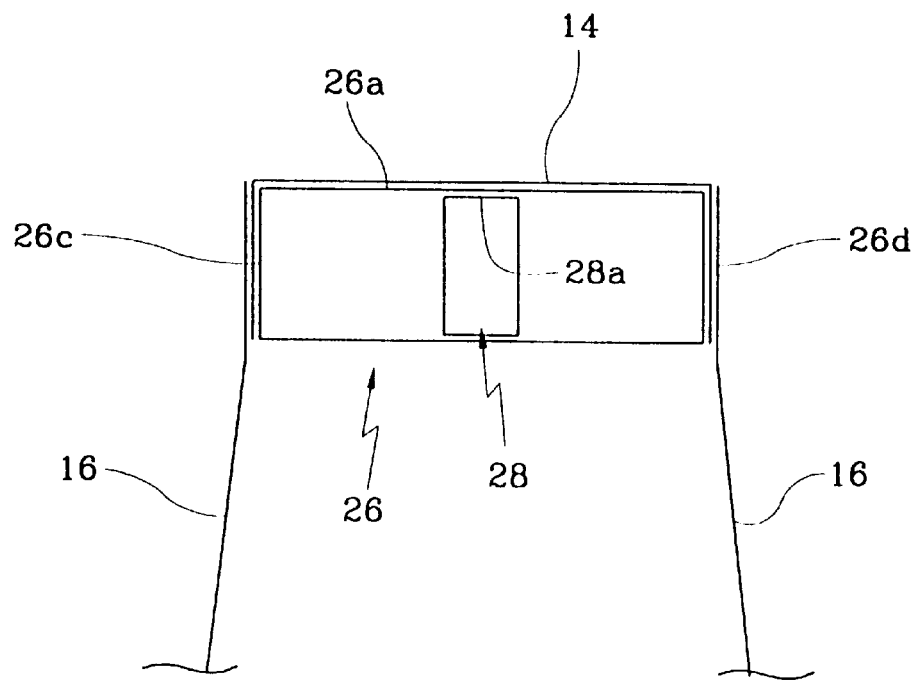
FIG. 6 is a sectional view taken along line A—A in FIG. 4.
Figure 7:
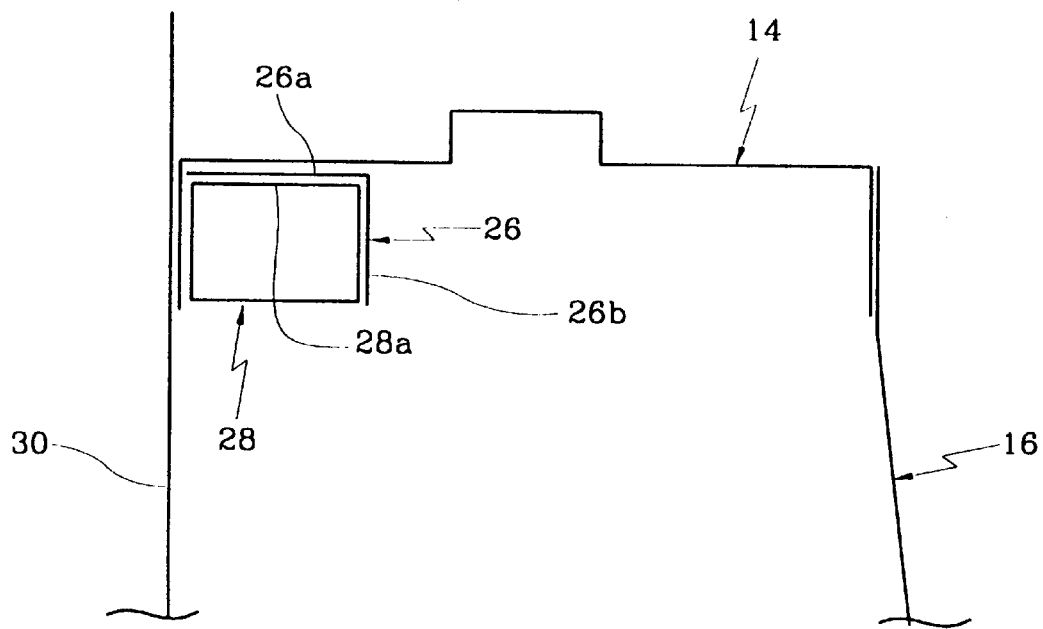
FIG. 7 is a sectional view taken along line B—B in FIG. 4.
Figure 8:
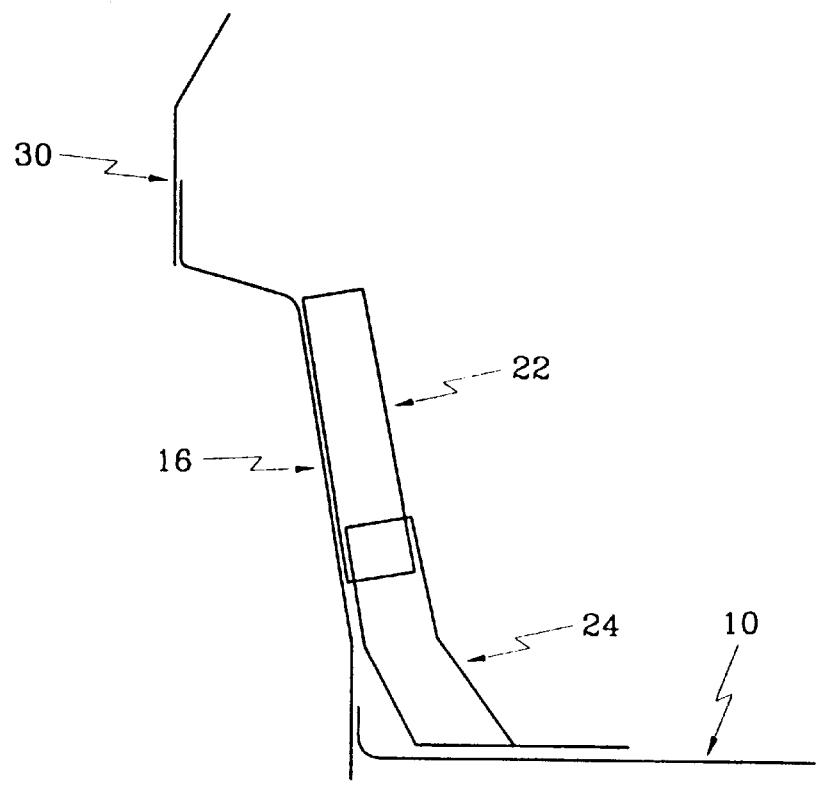
FIG. 8 is a sectional view taken along line C—C in FIG. 4.

FIG. 4 is a schematic perspective view for illustrating a rear wheel housing portion of a vehicle body according to the present invention, FIG. 5 is a perspective view of third and fourth reinforcement members illustrated in FIG. 4, and FIGS. 6, 7 and 8 are sectional views taken along lines A—A, B—B and C—C in FIG. 4.

Figure 1:
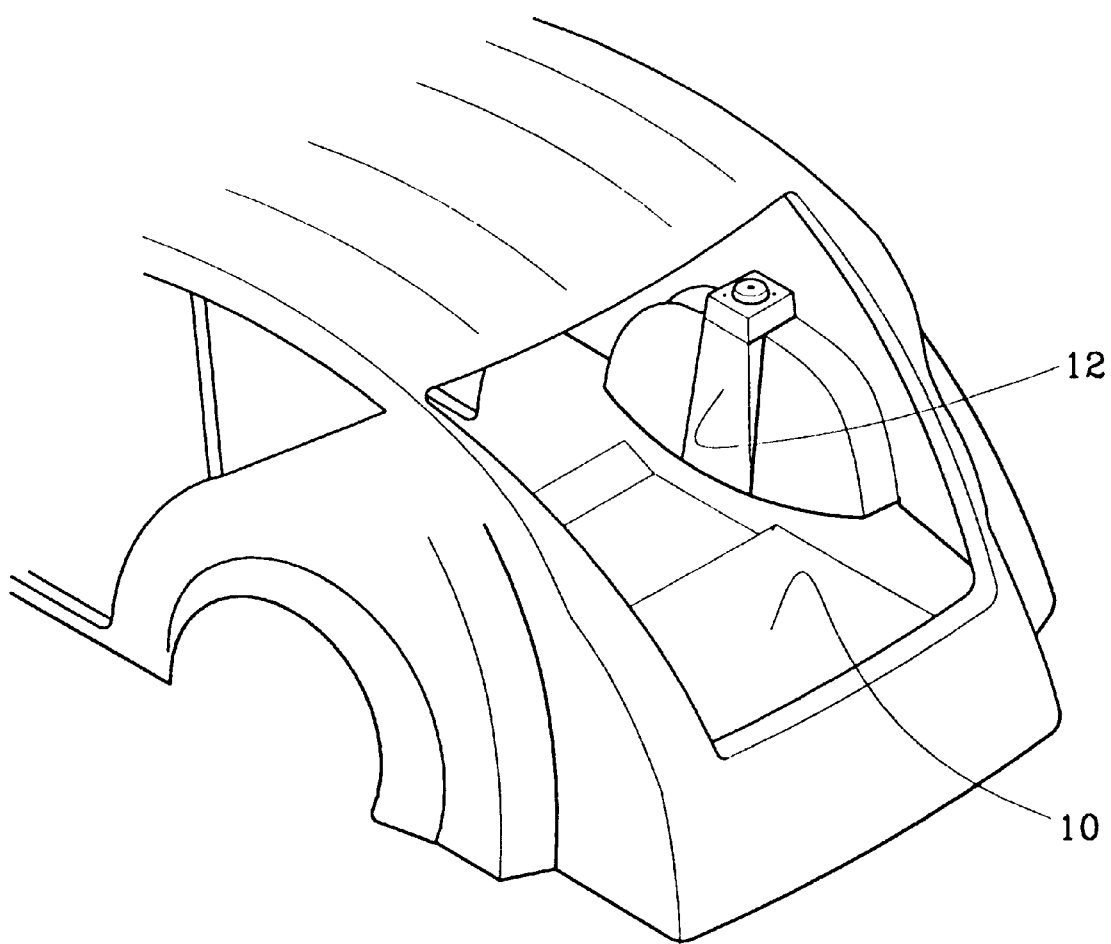
FIG. 1 is a schematic perspective view for illustrating a rear vehicle body of a vehicle according to the prior art.
Figure 2:
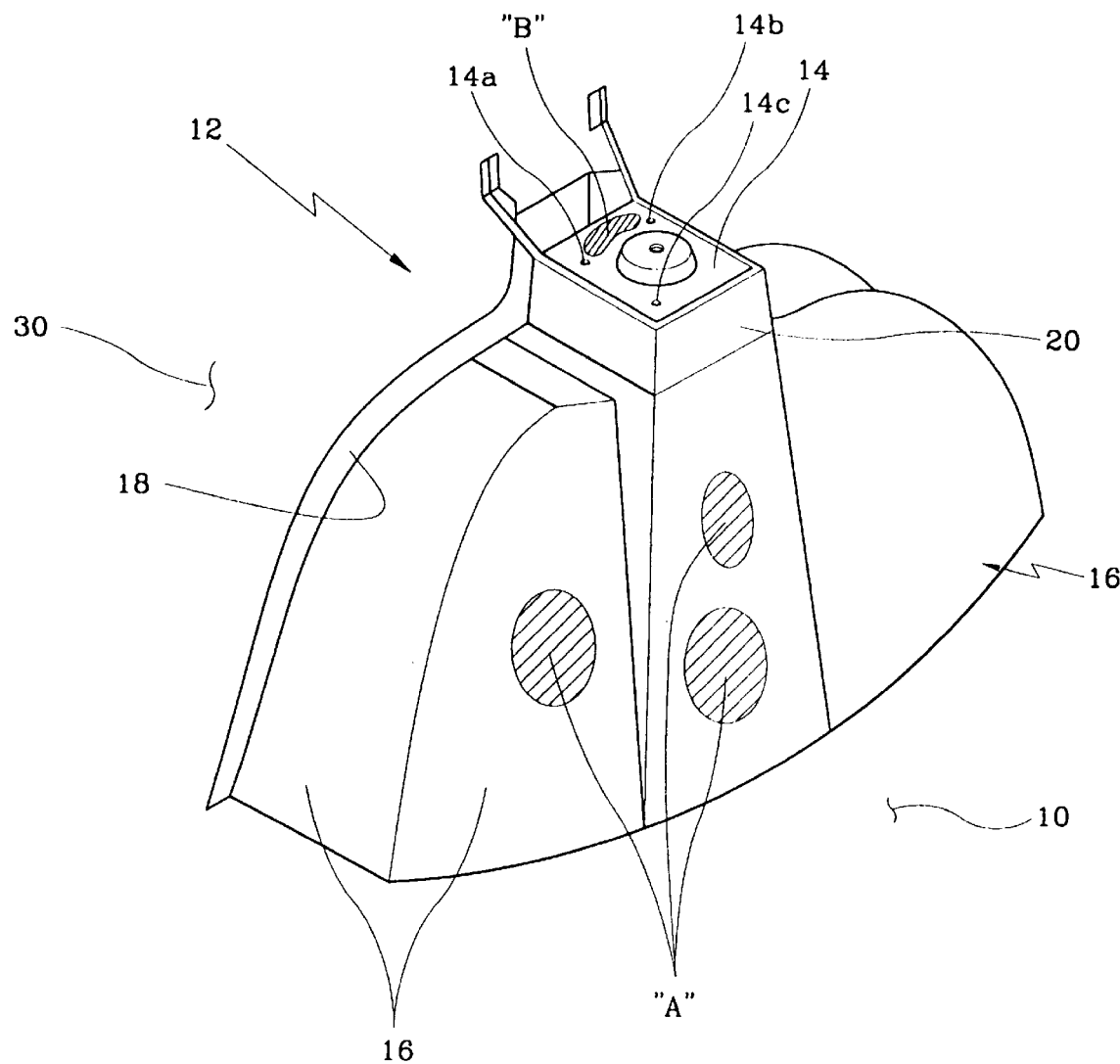
FIG. 2 is a perspective view for illustrating a rear wheel housing portion of a vehicle body according to the prior art.
Figure 3:
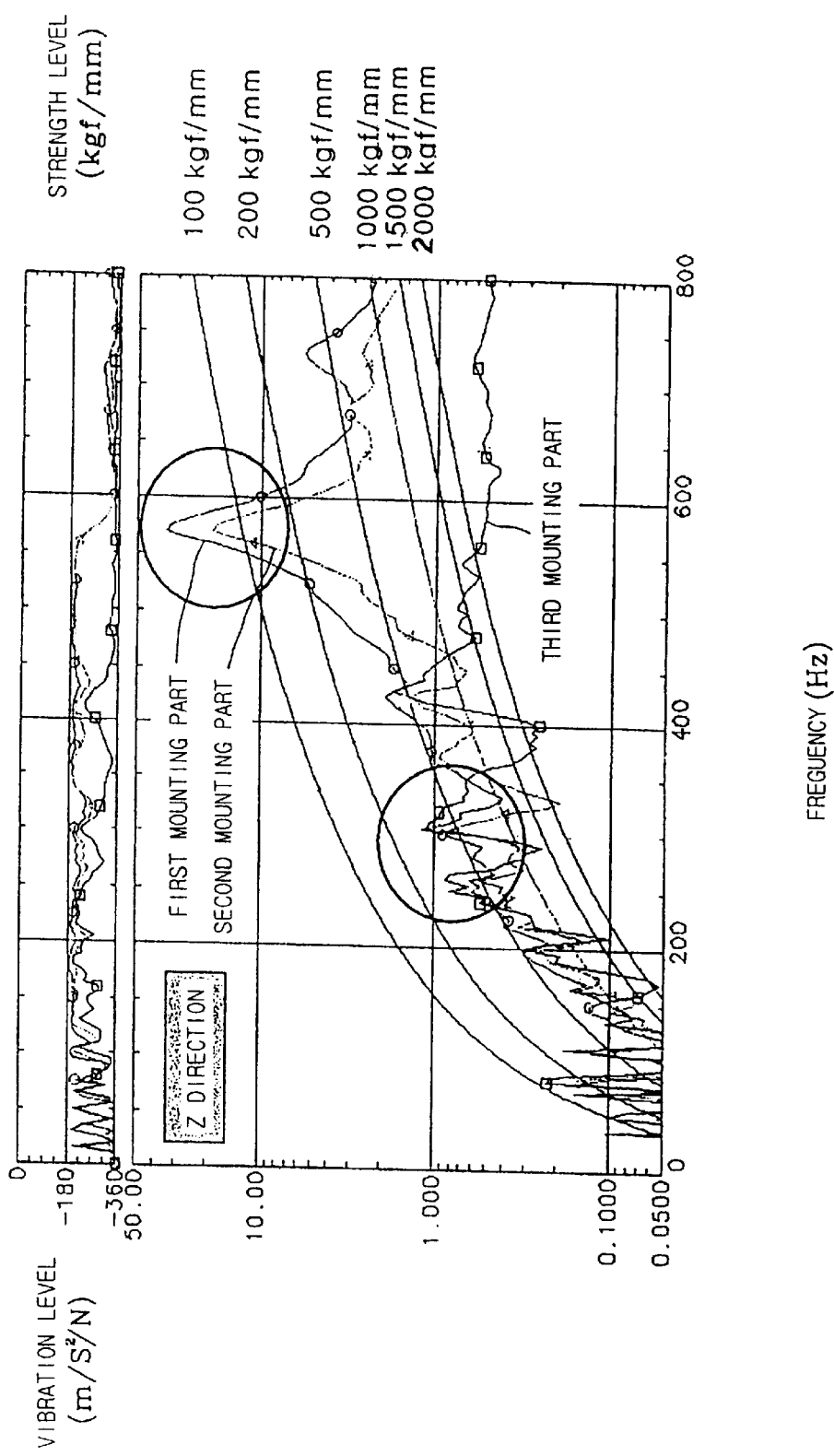
FIG. 3 is a frequency response function curve graph for illustrating a distribution of vibration level versus strength level at each domain of frequencies relative to a rear shock absorber mounting part of a rear wheel housing at a vehicle body according to the prior art.

Throughout the drawings, like reference numerals and symbols are used for designation of like or equivalent parts or portions as in FIGS. 1 and 2 for illustrating a rear wheel housing unit according to the prior art.

The present invention, as illustrated in the drawings, includes first and second reinforcement members 22 and 24 coupled at the wheel housing inner panel 16 of the rear wheel housing 12. The wheel housing inner panel extends upwards for a shock absorber of a rear suspension system and wheels at left and right portions of a rear floor panel 10.

At this location, the first reinforcement member 22 includes flange units 22a and 22b respectively surface-contacting a front surface 16a and a side surface 16b of the wheel housing inner panel 16 at the rear wheel housing 12, and a protruding unit 22c for protruding toward an internal side at a central portion of the flange units 22a and 22b to thereby form an inner closed space along with the front surface 16a and the side surface 16b.

The second reinforcement member 24 defines flange units 24a and 24b respectively surface-contacting the front surface 16a of the wheel housing inner panel 16 under the first reinforcement member 22 and the protruding unit 22c of the first reinforcement member 22, and a flange unit 24c surface-contacting the rear floor panel 10.

Meanwhile, the wheel housing cover 14 of the rear wheel housing 12 is coupled at a bottom surface thereof to a third reinforcement member 26 that extends along the length of the vehicle between first and second mounting parts 14a and 14b formed toward the external side of the vehicle body, and a fourth reinforcement member 28 is attached crosswise to a central portion between the first and second mounting parts 14a and 14b.

At this point, the third reinforcement member 26 is formed with an upper surface 26a contacting a bottom surface of the wheel housing cover 14, a side surface 26b that extends along the length of the vehicle and front/rear surfaces 26c and 26d contacting the upper surface 26a and the side surface 26b, as illustrated in FIG. 5.

The fourth reinforcement member 28 is formed with a hollow rectangular block having an upper surface 28a contacting a bottom surface of the upper surface 26a of the third reinforcement member 26.

Furthermore, the wheel housing inner panel 16 includes a flange coupling unit 18 bent and externally extended or be integrally formed to coupled to a quarter inner panel 30.

By this structure, the front surface 16a of the wheel housing inner panel 16 at the rear wheel housing 12, the side surface 16b and the rear floor panel 10 serve to reinforce structural strength through the first and second reinforcement members 22 and 24 respectively coupled thereto. A sectional portion of the rear wheel housing 12 respectively illustrating a section of A—A line, a section of B—B line and a section of C—C line is coupled to the upper surface 26a of the third reinforcement member 26 having the side surface 26b fieldwise extended to the bottom surface of the wheel housing cover 14, to thereby reinforce a structural strength of the wheel housing cover 14 at the rear wheel housing 12 relative to fieldwise direction of the vehicle body, and the upper surface 28a of the fourth reinforcement member 28 crosswise extended is again coupled to the bottom surface of the upper surface 26a of the third reinforcement member 26, to thereby reinforce a structural strength of the wheel housing cover 14.

Figure 9:
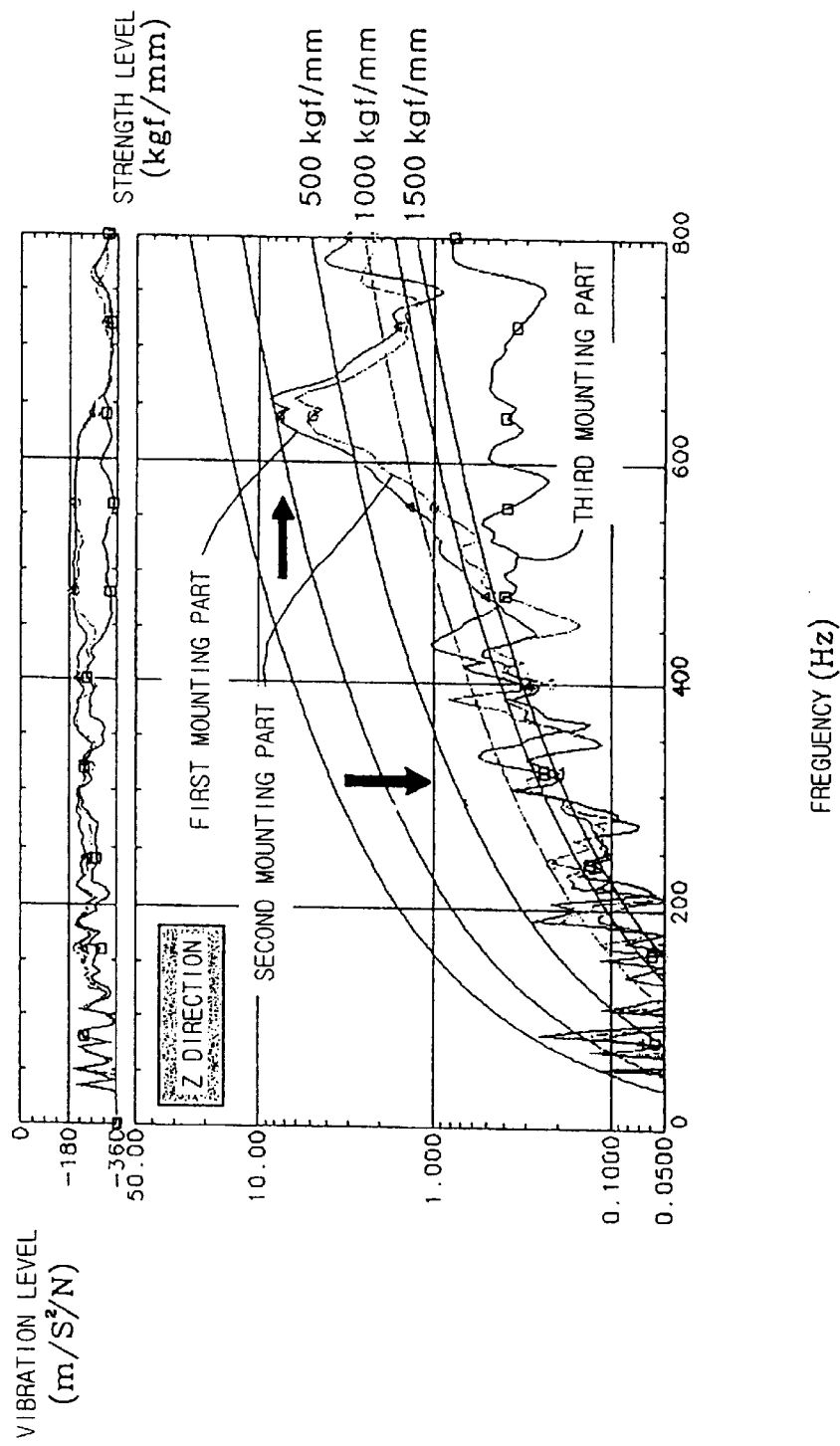
FIG. 9 is a frequency response function curve graph for illustrating a distribution of vibration level versus strength level at each domain of frequencies relative to a rear shock absorber mounting part of a rear wheel housing at a vehicle body according to the present invention.

Furthermore, if an analysis is made on the frequency response function curve illustrated in FIG. 9 for detecting a distribution of vibration level versus strength level for each domain of frequencies at low, intermediate and high speeds relative to mounting part of the wheel housing cover 14 of the rear wheel housing 12 equipped with the third and fourth reinforcement members 26 and 28, it can be shown that formerly sensitive inertance has been further decreased at the first and second mounting parts 14a, 14b formed before and after the vehicle body at the external side of the wheel housing cover 14 respectively at intermediate and high speed booming domains in comparison with the third mounting part 14c inwardly formed at the wheel housing cover 14 of the rear wheel housing 12.

It can be interpreted that decreased peak of vibration level has been resulted from a fact that fear of resonance with exciting frequencies caused by load input from the external side had been ruled out.

The interpretation may be also understood as having effectively limited a generation of road noise according to changes of sound field inside the vehicle.

Consequently, the reinforcement structure of rear wheel housing according to the present invention can reduce the vibration level at intermediate speed booming domain via the first and second reinforcement members 22 and 24 relative to rear floor panel 10 and the wheel housing inner panel 16 of the rear wheel housing 12, and also at high speed booming domain via the third and fourth reinforcement members 26 and 28 relative to the wheel housing cover 14 of the rear wheel housing 12. The present invention can also reduce a generation of road noise caused by resonance with exciting frequency due to load input from the external side while a vehicle is running.

As apparent from the foregoing, there is an advantage in the reinforcement structure for rear wheel housing of vehicle according to the present invention thus described in that a wheel housing inner panel and wheel housing cover of rear wheel housing are respectively coupled by a plurality of reinforcement members to further reduce vibration levels at intermediate and high speed booming domains, such that noise generated by resonance with exciting frequency input from road surface while a vehicle is running can be greatly decreased.

What is claimed is:

1. A reinforcement structure for a rear wheel housing of a vehicle, the rear wheel housing including a wheel housing cover and a wheel housing inner panel extending upwards from a rear floor panel to accommodate a shock absorber of a rear suspension system, the structure comprising:

first and second reinforcement members respectively coupled one above the other to the rear floor panel at a front corner part formed by front and side surfaces of the wheel housing inner panel;

a third reinforcement member extending in a direction of the length of the vehicle and coupled to a bottom surface of the wheel housing cover between first and second mounting parts of the wheel housing cover; and a fourth reinforcement member extending in a direction crosswise to the direction of the length of the vehicle and coupled to a central portion between the first and second mounting parts.

2. The structure as defined in claim 1, wherein the first reinforcement member includes flange units for respectively surface-contacting the front surface and side surface of the wheel housing inner panel at the rear wheel housing, and a protruding unit for protruding toward an internal side at a central portion between the flange units and to thereby form an inner closed space along the front surface and the side surface, and the second reinforcement member defines flange units for respectively surface-contacting the front surface of the wheel housing inner panel and the protruding unit of the first reinforcement member, and a flange unit surface-contacting the rear floor panel.

3. The structure as defined in claim 1, wherein the third reinforcement member is formed with an upper surface contacting a bottom surface of the wheel housing cover, a side surface extending in the direction of the length of the vehicle and front/rear surfaces for contacting the upper surface, the fourth reinforcement member is formed with a hollow rectangular block having an upper surface contacting a bottom surface of the upper surface of the third reinforcement member.

* * * * *